Patented Oct. 11, 1938

2,132,662

UNITED STATES PATENT OFFICE 2,132,662

ALIPHATIC AMINE SALTS OF CEVITAMIC ACID

Ernest H. Volwiler, Highland Park, and Marjorie B. Moore, Waukegan, Ill., assignors to Abbott Laboratories, North Chicago, Ill., a corporation of Illinois No Drawing. Application April 8, 1937, Serial No. 135,696

12 Claims. (Cl. 260—501)

The present invention relates to anti-scorbutic compounds and more particularly to aliphatic amine salts of cevitamic acid and solutions thereof possessing characteristics making them particularly adaptable for use as anti-scorbutic compositions.

It has been known for some time that cevitamic acid is of value in treating a variety of conditions due to lack of an adequate intake of anti-scorbutic vitamin C. In many patients, due to the need for more rapid action or to various difficulties in oral administration, it is desirable that the vitamin be given hypodermically in the form of an aqueous solution of appropriate concentration. For parenteral administration it is desirable to have sterile stable solutions which may be kept in ampules until needed. This has not been found possible, however, in the case of cevitamic acid itself as the solution of the acid gradually undergoes autoxidation and becomes less active physiologically. Moreover, the acidity of such solutions is so high that the injection may be painful and may produce tissue damage. Certain metallic salts of cevitamic acid such as the sodium and calcium salts have been used to overcome the latter objection as they give a pH value more acceptable to the tissues of the body. However, solutions of metallic salts of cevitamic acid, like the solutions of the acid itself, also tend to undergo autoxidation resulting in the lowering of the physiological potency. For this reason such salts are usually marketed in ampules containing the dry powder, the solutions being prepared extemporaneously just before use. This procedure not only causes great inconvenience to the physician, but increases the danger of bacterial contamination. The medical profession has long desired a solution suitable for hypodermical administration containing cevitamic acid or salts thereof that would retain its high anti-scorbutic potency.

It is, therefore, the principal object of our invention to provide stable solutions containing cevitamic acid or salts thereof that possess characteristics which make them particularly adapted for use as anti-scorbutic compositions.

It is another object of our invention to provide aliphatic amine salts of cevitamic acid that are capable of forming aqueous solutions of constant potency.

It is still another object of our invention to provide solutions containing aliphatic amine salts of cevitamic acid of proper pH value for hypodermical administration.

It is a further object of our invention to provide a process for preparing substantially pure aliphatic amine-cevitamic acid reaction products that possess the desired characteristics for use in anti-scorbutic treatment.

Other objects will be apparent as the description hereinafter proceeds.

We have discovered that aliphatic amine salts of cevitamic acid form stable solutions which may be kept in ampules for long periods of time without any appreciable decomposition. The aliphatic amines of our invention include alkyl and hydroxy alkyl (alkanol) mono- and polyamine and alicyclic amine salts of cevitamic acid. The solutions of the various salts which may be adjusted to the proper pH value as hereinafter described retain their anti-scorbutic or vitamin C potency and are non-irritating to the body tissues.

The following examples will serve to illustrate the preparation of aliphatic amine salts of cevitamic acid and stable solutions thereof in accordance with our invention.

Example I

About 10 grams of cevitamic acid and about 11 grams of methylglucamine are separately dissolved in absolute alcohol, the solutions filtered if necessary, and the amine solution slowly added to the acid solution with stirring and cooling. A white crystalline precipitate of methylglucamine cevitamate is obtained. When first formed, this compound is very hygroscopic and becomes gummy and dark if exposed to the air. However, if the product is well dried in a vacuum desiccator it is stable and when so dried softens and melts at about 55°–58° C.

In order to prepare an aqueous solution of methylglucamine cevitamate, we prefer to add the amine to the aqueous solution of the acid until the desired pH value is obtained. For this purpose a 5 per cent solution of cevitamic acid in distilled water is prepared and methylglucamine added to raise the pH value to about 6 to 7. The solution is saturated with nitrogen and filled into ampules which may be sterilized in the usual manner at the temperature of boiling water.

Example II

By the same method described in Example I, ethylenediamine cevitamate, a solid white or slightly yellowish crystalline material melting at 78°–80° C. may be prepared from 10 grams of cevitamic acid and 1.7 grams of ethylenediamine. This product is also very hygroscopic and must be carefully dried in a vacuum desiccator. After drying, the salt should be preserved in a closed container.

An aqueous solution of this salt suitable for hypodermical administration may be prepared by adding ethylene-diamine to an aqueous solution of cevitamic acid until the desired pH value is reached. For example, to a 5 per cent solution of cevitamic acid in distilled water sufficient ethylenediamine should be cautiously added to raise the pH value to about 6. This solution should also be treated and sterilized as described in Example I.

*Example III*

Similar to the method employed in Examples I or II, monoethanolamine cevitamate may be prepared from 5 grams of cevitamic acid and 1.7 grams of monoethanolamine. The product obtained is a very viscous liquid which does not readily crystallize. An aqueous solution of this compound may be prepared in the usual manner by adding monoethanolamine to a 5 per cent solution of cevitamic acid in distilled water until the pH value is adjusted to about 6. This solution should also be treated as in Examples I and II.

*Example IV*

Similar to the method employed in Examples I and II, tri-isopropanolamine cevitamate may be obtained as a viscous liquid when about 5.3 grams of tri-isopropanolamine and about 5.0 grams of cevitamic acid are mixed together. To prepare the aqueous solution, tri-isopropanolamine should be added to an aqueous solution of cevitamic acid to raise the pH value to about 6, or any other value desired. This solution should be sterilized as described in the previous examples.

We have found that solutions of the aliphatic amine salts of cevitamic acid such as described above are free from autoxidation and retain their physiological potency for long periods of time. Although we prefer to maintain an essentially neutral pH value in the solutions, it will be understood by those skilled in the art that our invention is not limited thereto and that the pH values of the various solutions may be adjusted to any desired value by the addition of an excess of either amine or cevitamic acid. It will, however, be obvious to those skilled in the art that the solutions should not be so highly alkaline or so highly acid as to be irritating when administered hypodermically.

It will also be understood by those skilled in the art that our invention includes the use of other alkyl amines including methyl, ethyl, propyl, butyl, amyl, etc., mono-, di- and tri-amines and other hydroxy amines including ethanol, propanol and butanol mono-, di- and tri-amines. Our invention also includes the use of other polyhydric alkamines. Our invention also includes unsaturated aliphatic amines such as the various allyl and crotonyl amine salts and further includes the cyclo aliphatic amines such as the various cyclopentyl and cyclohexyl amine salts. In addition our invention includes the use of various morpholine salts of cevitamic acid. The following list illustrates the type of cevitamic acid salts prepared and studied by us: allylamine, triallylamine, dibutylamine, 2-aminopentane, mono-n-amylamine, dicyclohexylamine, ethyl-cyclohexylamine, glucamine, ethyl-glucamine, ethanolglucamine, 1-methylamino-2, 3-di-hydroxypropane and morpholine. Our invention, of course, includes the use of various mixed di- and tri-aliphatic amine salts of cevitamic acid in which unlike aliphatic groups are attached to the nitrogen atom.

While we have illustrated our invention with examples employing specific ingredients and various pH values, it will be understood that our invention is not limited thereto. All modifications coming within the spirit and scope of our invention are intended to be covered by the claims appended hereto.

We claim:
1. Aliphatic amine salts of cevitamic acid.
2. Alkyl amine cevitamate.
3. Hydroxy alkyl amine cevitamate.
4. Methylglucamine salt of cevitamic acid.
5. Ethylenediamine cevitamate.
6. Monoethanolamine cevitamate.
7. An anti-scorbutic solution containing aliphatic amine salts of cevitamic acid.
8. An anti-scorbutic solution adaptable for hypodermical administration containing alkyl amine cevitamate.
9. An anti-scorbutic solution adaptable for hypodermical administration containing alkanol amine cevitamate.
10. Sterile anti-scorbutic solutions adaptable for hypodermical administration, comprising an aqueous solution containing the reaction product of aliphatic amine and cevitamic acid, said solution being characterized by constant anti-scorbutic potency over long periods of time.
11. An ampule filled with a sterile anti-scorbutic aqueous solution containing the reaction product of methyl-glucamine and cevitamic acid, said solution having a pH value of about 7 and being characterized by constant physiological potency over long periods of time.
12. The process of preparing anti-scorbutic solutions of constant physiological potency, which comprises adding aliphatic amine to a dilute aqueous solution of cevitamic acid, sufficient amine being added to raise the pH value of the acid solution so as to make the solution adaptable for hypodermical administration.

ERNEST H. VOLWILER.
MARJORIE B. MOORE.